United States Patent [19]

Grabowski

[11] Patent Number: 6,023,558
[45] Date of Patent: Feb. 8, 2000

[54] GRAPHICS COMPRESSION FOR AN EMULATION SYSTEM

[75] Inventor: John R. Grabowski, Sunnyvale, Calif.

[73] Assignee: Apple Computer, Inc., Cupertino, Calif.

[21] Appl. No.: 08/698,553

[22] Filed: Aug. 15, 1996

Related U.S. Application Data

[63] Continuation of application No. 08/676,031, Jun. 27, 1996.

[51] Int. Cl.$^7$ ..................................................... H04N 7/26
[52] U.S. Cl. ......................... 395/109; 395/109; 395/114; 358/426; 358/448; 358/539; 358/518; 382/166; 382/245; 348/246; 348/247; 348/251; 348/254
[58] Field of Search ..................................... 345/502, 504, 345/522, 523, 525, 526, 438; 395/112, 109, 114, 707; 382/166, 245, 162–167; 704/277; 358/426, 448, 539, 518, 464, 261.1; 348/246, 247, 251, 254

[56] References Cited

U.S. PATENT DOCUMENTS

| | | | |
|---|---|---|---|
| 4,586,027 | 4/1986 | Tsukiyama et al. | 340/347 |
| 4,701,745 | 10/1987 | Waterworth | 340/347 |
| 4,872,009 | 10/1989 | Tsukiyama et al. | 341/95 |
| 4,903,218 | 2/1990 | Longo et al. | 364/521 |
| 4,906,991 | 3/1990 | Fiala et al. | 341/51 |
| 4,955,066 | 9/1990 | Notenboom | 382/56 |
| 4,988,998 | 1/1991 | O'Brien | 341/51 |
| 5,001,478 | 3/1991 | Nagy | 341/67 |
| 5,003,307 | 3/1991 | Whiting et al. | 341/51 |
| 5,016,009 | 5/1991 | Whiting et al. | 341/67 |
| 5,049,881 | 9/1991 | Gibson et al. | 341/95 |
| 5,051,745 | 9/1991 | Katz | 341/51 |
| 5,126,739 | 6/1992 | Whiting et al. | 341/106 |
| 5,140,321 | 8/1992 | Jung | 341/55 |
| 5,155,484 | 10/1992 | Chambers, IV | 341/55 |
| 5,408,602 | 4/1995 | Giokas et al. | 395/167 |
| 5,450,130 | 9/1995 | Foley | 348/391 |
| 5,689,255 | 11/1997 | Frazier et al. | 341/63 |
| 5,740,801 | 4/1998 | Branson | 128/653.1 |

OTHER PUBLICATIONS

"Compression FAQ Parts 1–3," from Internet USENET Newsgroup Comp Compression, Aug. 1995.

*Primary Examiner*—Scott Rogers
*Assistant Examiner*—Lance W. Sealey
*Attorney, Agent, or Firm*—Edward W. Scott, IV

[57] ABSTRACT

Compressing graphic data for a first computer system, e.g. an emulated system, on a second computer system. For each scanline of the graphic data for the first computer system, a number of colors present on the scanline are counted. A new color palette for the scanline is formed at a reduced representation. Then, a representation of each color of each pixel on the scanline is converted to the new palette. The scanline is then run-length encoded. The graphic data is compressed so that it can be, for example, transmitted between a client (e.g. an X client) and a server (e.g. an X server) and conserve network bandwidth.

25 Claims, 11 Drawing Sheets

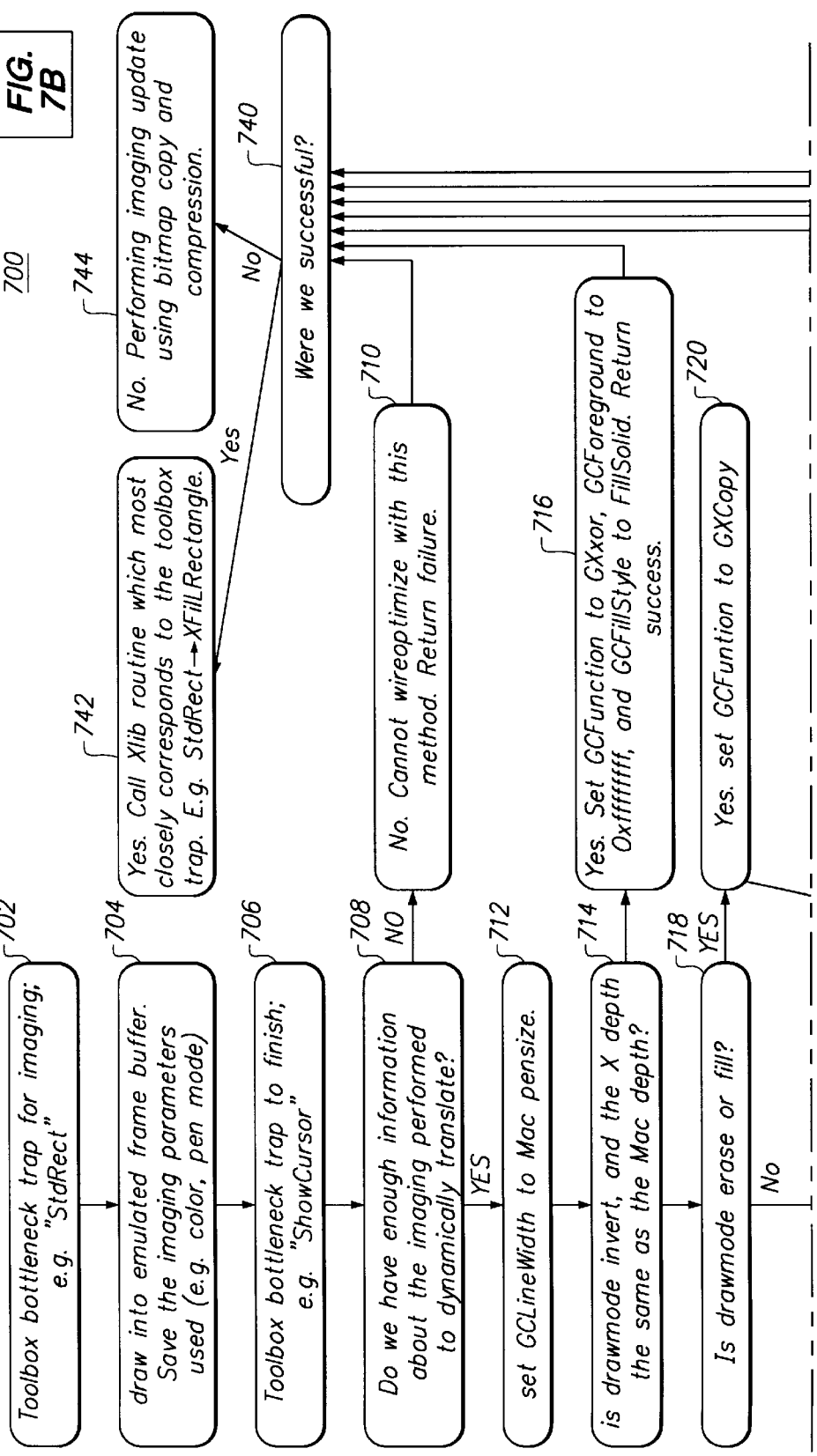

GRAPHICS COMPRESSION FOR AN EMULATION SYSTEM

CROSS REFERENCE TO RELATED APPLICATION

This is a continuation of application Ser. No. 08/676,031, filed Jun. 27, 1996 entitled "Dynamic Translation of Graphics Library Calls" by John R. Grabowski and Stephen C. Peters.

BACKGROUND OF THE INVENTION

1. Field of the Invention

The present invention relates to emulation of a first type of computer system on a second computer system. More specifically, the present invention relates to the compression of graphic data for a first computer system on a second computer system.

2. Background

Prior approaches to emulation frequently involve emulating the hardware upon which a target, or emulated platform, is based. That is, the underlying hardware upon which the emulated system is based is emulated in the emulating system.

An example of such an emulation system is shown with reference to FIG. 1. The system of FIG. 1 illustrates the MAE (Macintosh®) Application Environment) version 2.0 brand emulation system available from Apple Computer, Inc. of Cupertino, Calif. This version of MAE emulates the Motorola 68000 family of microprocessors on an X windows workstation, such as those available from Sun or Hewlett-Packard. In this architecture, the Macintosh® brand applications and the Finder portions of the Mac® OS brand operating system (trademarks of Apple Computer, Inc.) operate at the highest layer, and communicate with the Macintosh Toolbox and System ROM routines on a Macintosh® compatible computer system. These processes are in communication with a framework known as the Mac/Unix Scaffolding and a Motorola 68000 type emulator which is resident in the computer workstation. The emulator is in communication with OS Interface and Native Code Accelerator which communicate with various layers in the workstation, such as the X Window system itself, the Unix OS and Networking layer and the Unix Platform hardware at the lowest layer.

Common operations which are performed in such an environment are graphics routines which draw various objects requested by the underlying application or the operating system. Such operations can be performed in the X server/X client environment wherein a client system emulates the Macintosh system and transmits bitmap information over a network to an X server. For example, at a first step 202 an application (or the operating system) can invoke a toolbox imaging routine such as "FillRect()" in order to render an image on the display (e.g. a rectangle). The invocation of this function would cause a toolbox trap for imaging (e.g. "StdRect") for drawing the object at step 204. The emulation of the toolbox routine would cause the drawing of the object into an emulated frame buffer (for the emulated system) in the client at step 206. Subsequent thereto, the a toolbox trap might be caused which would request refresh of the screen at step 208, such as a "ShowCursor" command. The changed region of the emulated frame buffer would then be transmitted at step 210 over a network or other communication medium to the X Server. Subsequently thereto, the bit map is received by the X server at step 212 and the X server copies the bit map to the screen at step 214.

One shortcoming of this approach is the high network traffic which is generated. Because the emulation system emulates the lower levels of the Macintosh system, bit maps themselves are generated and transmitted between an X client and X server. In some typical single-user interaction circumstances, a large amount of network bandwidth may be consumed. Unfortunately, as the number of X servers increase, so does network traffic. As a result, the network can rapidly reach its maximum capacity.

Thus, improved techniques for emulation, especially in the client/server environment which are coupled over a network, is desired.

SUMMARY

An apparatus and method for compressing graphic data for a first computer system on a second computer system. For each scanline of the graphic data for the first computer system, a number of colors present on the scanline are counted. A new color palette for the scanline is formed at a reduced representation. Then, a representation of each color of each pixel on the scanline is converted to the new palette. The scanline is then run-length encoded. The graphic data is compressed so that it can be, for example, transmitted between a client (e.g. an X client) and a server (e.g. an X server) in order to conserve network bandwidth.

In exemplary embodiments, the graphic data includes computer-generated graphic information generated via graphics subsystem calls for the first computer system and the first computer system is emulated in the second computer system.

In one embodiment, transmitting the compressed representation of the scanline includes transmitting the new palette and each color of the scanline after the converting and the run-length encoding. Run-length encoding the scanline includes run-length encoding the colors in groups of two or eight consecutive pixels on the scanline.

The graphic data includes a bitmap which is formed by an emulator interpreting the graphics subsystem calls for the first computer system and generating the bitmap responsive thereto. In exemplary embodiments, the first computer system includes a Macinstosh and the second computer system includes a Unix workstation.

BRIEF DESCRIPTION OF THE DRAWINGS

The present invention is illustrated by way of example and not limitation in the figures of the accompanying in which like references indicate similar elements and in which.

DETAILED DESCRIPTION

The present invention relates to the emulation of a first computer system on a second computer system or system(s).

Although the present invention will be described with reference to certain specific embodiments thereof, especially, with relation to certain hardware configurations, bit lengths, encoding methods and formats, method steps, and other specific details, these should not be viewed as limiting the present invention. Various modifications and other changes may be made by one skilled in the art, without departing from the overall spirit and scope of the present invention.

A portion of the disclosure of this patent document may contain material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright© Apple Computer, Inc.

Figure 3:
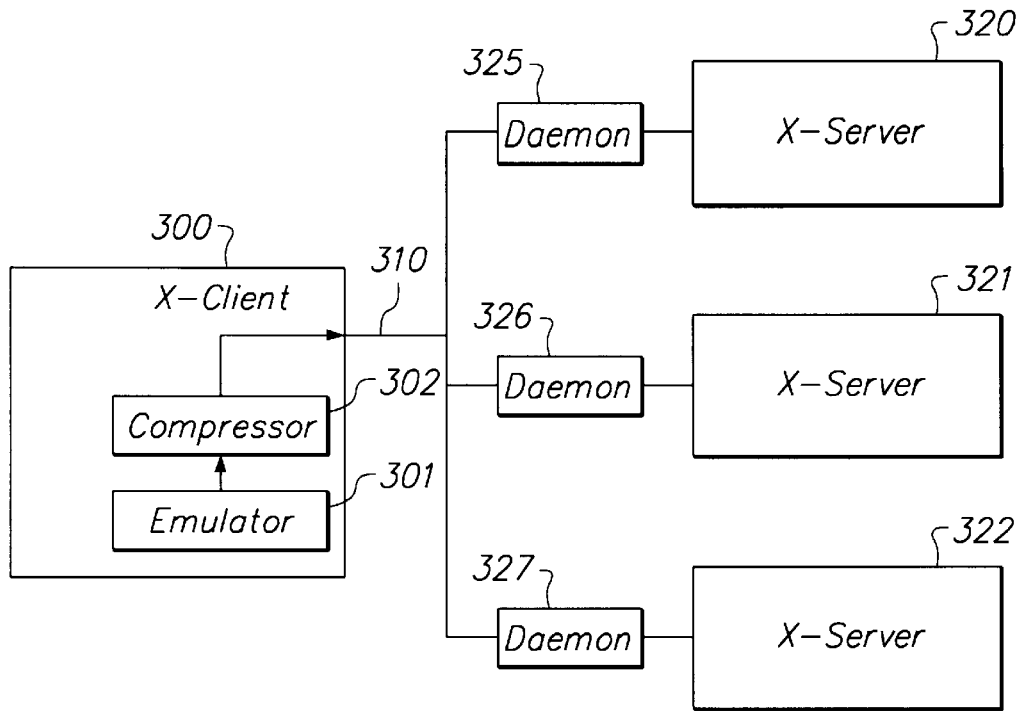
FIG. 3 shows a emulation system having an X server and X clients.

A typical system configuration in which embodiments of the present invention may be implemented is shown in FIG. 3. The system includes an X client 300 and one or more X servers 320–322. X client 300 provides the emulation functionality, and the X server(s) 320–322 provide the display and user-input functions (mouse clicks, keyboard input, etc . . . ) to the X client 300. The X client 300 and the X server(s) 320–322 communicate over a communication medium 310, such as high-speed ethernet. Standard X protocol messages are transmitted back and forth to synchronize the client 300 with the servers 320–322. In addition to the standard X protocol, the X client contains the emulator 301 for emulating the function of a second computer system having a second architecture (e.g. a Macintosh® brand personal computer executing the Mac® OS brand operating system), and a compressor 302 for further reducing the data which would otherwise be transmitted from the client 300 to the server(s) 320–322.

In addition to the standard X server functionality, each server 320–322 is coupled to the client through a corresponding daemon or background process 325–326 which contains the corresponding decompression functions from that performed by the compressor 302. Thus, when compressed data is detected in one of the X servers 320–322, the corresponding daemon 325–327 becomes operative decompressing the data for display on the server's display.

Figure 4:
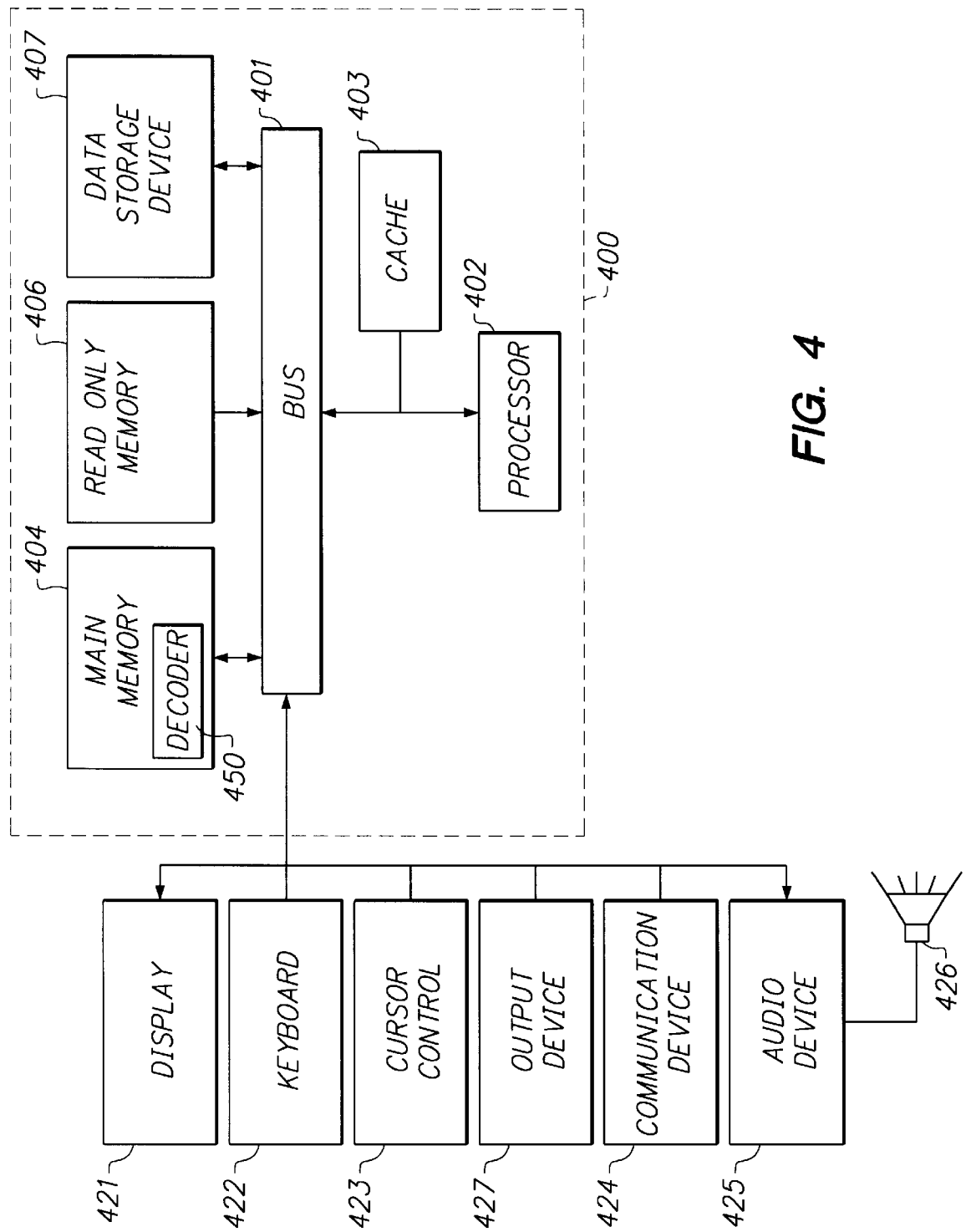
FIG. 4 shows a block diagram of a single X server in which methods of the present invention may be implemented.

In various embodiments of the present invention, a general purpose computer system or workstation is used for implementing the methods and mechanisms to be described here. A computer system, such as a workstation, personal computer or other processing apparatus 400 is illustrated in more detail in FIG. 4. This system may be used for executing the X client 300 shown in FIG. 3. Scaled down versions of this system may be used for executing any or all of the X servers 320–322. 400 comprises a bus or other communication means 401 for communicating information, and a processor 402 coupled with bus 401 for processing information. System 400 further comprises a random access memory (RAM) or other volatile storage device 404 (referred to as main memory), coupled to bus 401 for storing information and instructions to be executed by processor 402. Main memory 404 also may be used for storing temporary variables or other intermediate information during execution of instructions by processor 402 during run-time. System 400 also comprises a read only memory (ROM) and/or other static storage device 406 coupled to bus 401 for storing static information and instructions for processor 402, and a data storage device 407 such as a magnetic disk or optical disk and its corresponding disk drive. Data storage device 407 is coupled to bus 401 for storing information and instructions.

System 400 may further be coupled to a display device adapter 421 such as a cathode ray tube (CRT) or liquid crystal display (LCD) coupled to bus 401 for displaying information to a computer user. Such a display 421 may further be coupled to bus 401 for the receipt of video or image information. An alphanumeric input device 422, including alphanumeric and other keys may also be coupled to bus 401 for communicating information and command selections to processor 402. An additional user input device is cursor control 423, such as a mouse, a trackball, stylus, or cursor direction keys, coupled to bus 401 for communicating direction information and command selections to processor 402, and for controlling cursor movement on display 421. A hard copy output device 427 can also be coupled to bus 401 for generating hard copy information.

System 400 may also include a communication device 424 which is useful for communicating with networks and/or other systems. For example, this may include a network adapter which is configured to receive signals over a computer network. System 400 may also include an audio device 435 for the output of audio information to a transducer such as a speaker 426.

Main memory 404 of system 400 may include therein an executable program or module 450 for the emulation of the Mac® OS brand operating system within system 400. This may include the emulator, dynamic translator, and compressor, as required. This module includes executable instructions which are retrieved from main memory 404 and executed by processor 402. Instructions and other information may be cached in a cache 403 coupled to processor 402, including instructions of and/or data used by decode module 450. Cache 403 may be internal to processor 402 (e.g. an L1 cache) and/or external to processor 402 (an L2 cache) according to different implementations.

Note, also, that any or all of the components of system 400 and associated hardware may be used in various embodiments, however, it can be appreciated that any configuration of the system may be used for various purposes according to the particular implementation.

In one embodiment, system 400 is a Unix workstation executing X windows, such as those commercially available from Hewlett-Packard corporation or Sun Microsystems.

Note that the following discussion of various embodiments discussed herein will refer specifically to a series of routines which are generated in a high or low level programming language (e.g., the C++ programming language or processor-specific assembly code) and compiled (or assembled), linked, and then run as object code in system 400 during run-time within main memory 404 by processor 402.

Although a general purpose computer system or workstation has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 2:
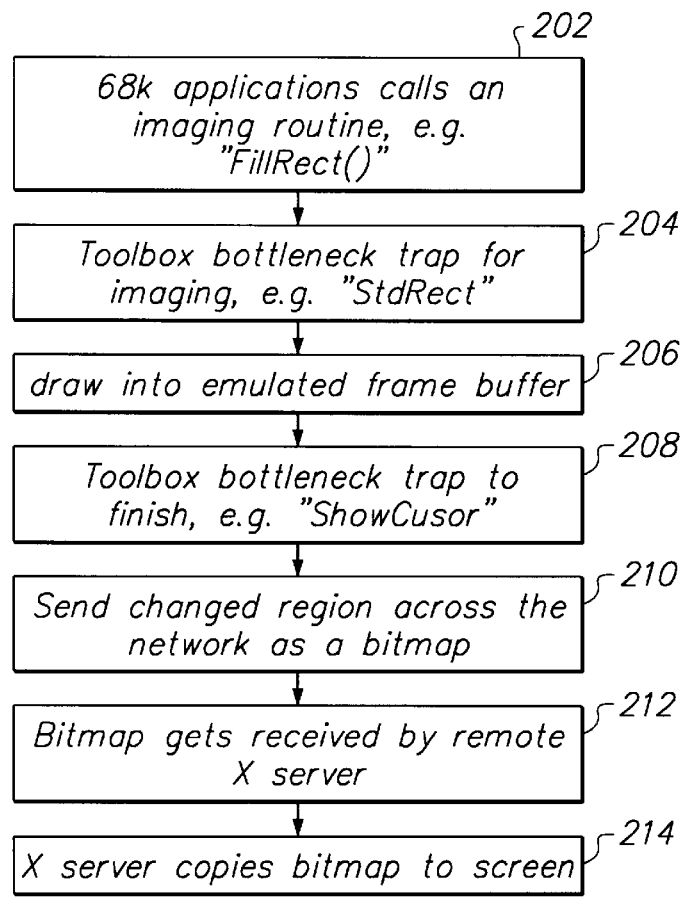
FIG. 2 shows a prior art method for displaying bit map imagery in an emulation system.
Figure 5:
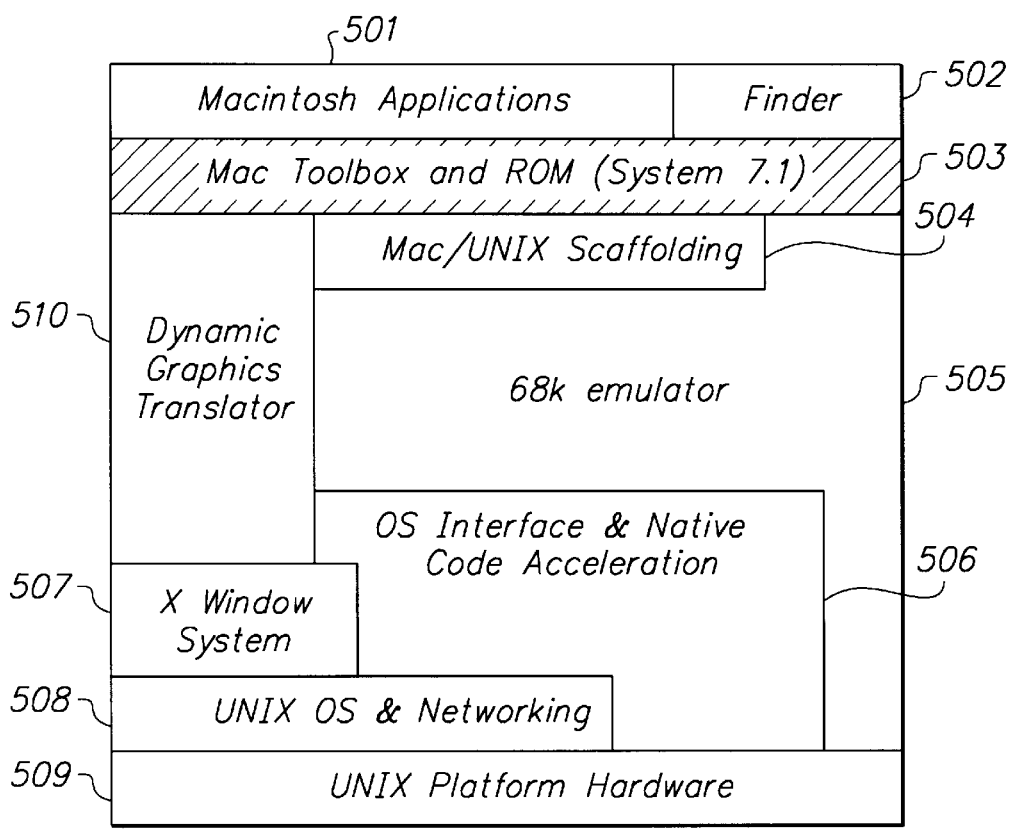
FIG. 5 shows a block diagram of an emulation system in implemented embodiments.

An architecture of the emulation system is shown in FIG. 5. It is similar to the prior art system shown in FIG. 2, with some exceptions. Again, Macintosh® brand applications and the Finder portions of the Mac® OS brand operating system (trademarks of Apple Computer, Inc.) operate at the highest layer, and communicate with the Macintosh Toolbox and System ROM routines 503. These processes communicate with the Mac/Unix Scaffolding 504 and a Motorola 68000 type emulator 505 which is resident in the computer workstation. The emulator 505 is in communication with a OS interface 506 which communicates with various layers in the X windows workstation, such as the X Window system 507, the Unix OS and Networking layer 508 and the Unix Platform hardware 509 at the lowest layer.

Figure 1:
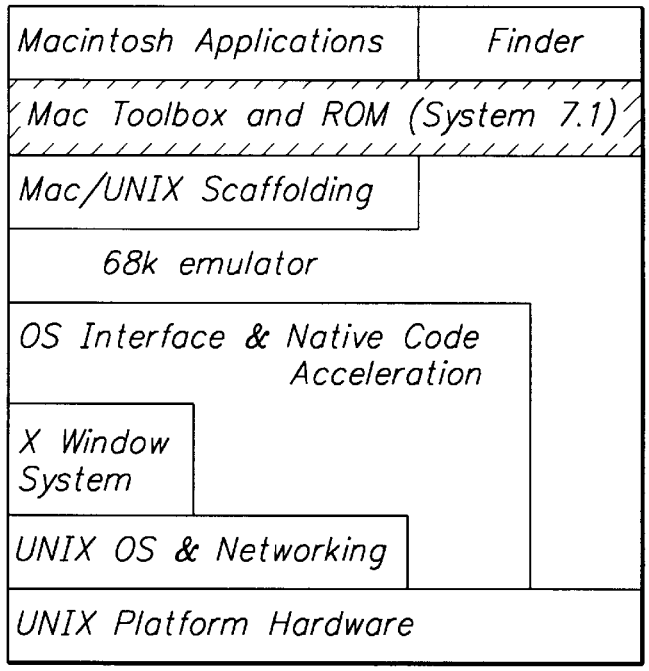
FIG. 1 illustrates a prior art emulation architecture.

A distinction between this environment and that of the prior art as shown in FIG. 1, is that the Toolbox and ROM Routines 503 communicate not only with the framework 504 and emulator 505, but also with the Interface 506 and X Window System 507 itself. For example, graphics subsystem calls to those in the Macintosh portion 503 of the system may be directly translated into corresponding graphics call(s) to the X Window System 507 on the X client 300. Thus, instead of emulation at lower levels in the architecture hierarchy, translation from one graphics subsystem to the other may be performed, to emulate the behavior of a first computer system (e.g a Macintosh compatible type computer) on a second computer system or workstation (e.g. a Unix workstation running X Windows). In this manner, graphics subsystem calls across the communication medium 310 may be called to generate geometry on the X servers 320–322. Rather than bit-maps or other low-level representations of objects, abstractions of graphical objects in the form of graphics toolbox command(s) can be transmitted from a first computer to a second computer (e.g. an X client to an X server) to render these objects, conserving bandwidth. This functionality is provided by the additional process or component 510, the dynamic graphics translator, which bypasses the functional blocks 504, 505 and 506, and translates calls directly between the emulated system 503 (which receives graphics commands from applications 501 and the Finder or operating system 502) from the emulated environment to the underlying local graphics subsystem 507.

Figure 6:
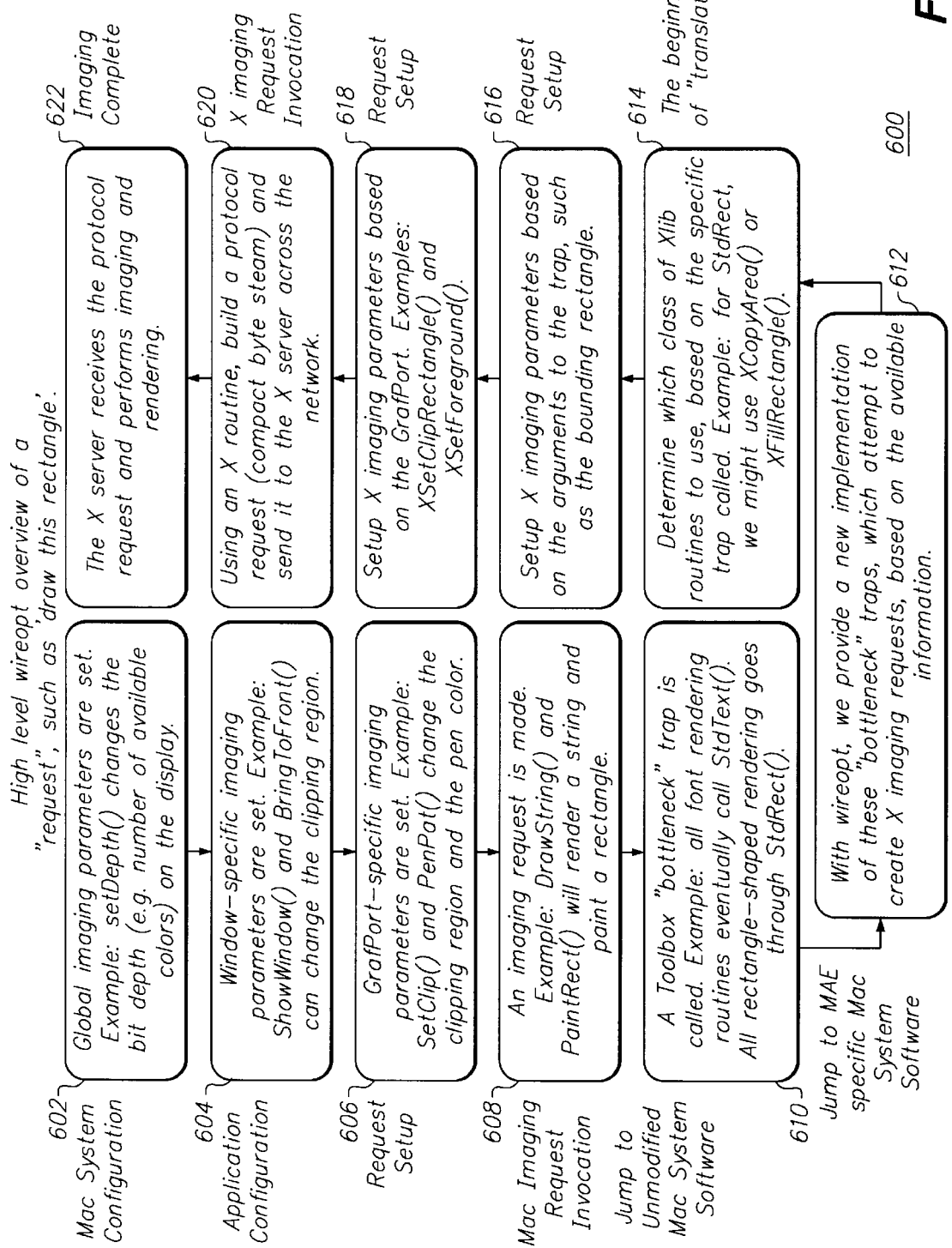
FIGS. 6–9 show methods for dynamic translation of rendering operations from a first system on a second system.

An overview of a method performed by the dynamic graphics translator 510 of translating from one graphics toolbox call (e.g. the Quickdraw system used in the Mac OS brand operating system) to a second graphics toolbox call (e.g. the X Windows system), is illustrated with reference to FIG. 6. Note that for the remainder of this application the reference to the toolbox "bottleneck" trap refers to the invocation of a trap or interrupt in the Mac OS environment which results from the execution of particular graphics library calls, such as StdRect() or StdText(). Upon the completion of the establishment of certain environment variables (e.g. pen color, clipping windows, etc . . . ), the trap is invoked by the appropriate call, which causes a trap, along with specified arguments, and the appropriate graphics are rendered to the display. In this application, of course, the rendering is to the emulated system, that is, the X client which drives the X servers. The call, or trap, causes the invocation of a trap handler which provides the specified functionality. Because the instant application involves emulation, or more appropriately, translation from a first graphics subsystem (e.g. Quickdraw in the Mac Os operating system) to a second graphics subsystem (e.g. X Windows), the trap handler(s) which would normally perform graphics operations, such as rendering, in this instance performs dynamic translation of the calls which causes the rendering on the local machine.

The translation functions at times have a direct mapping between a single graphics call in the first computer system to a single call in the second system. Often, however, this is not the case. Frequently, the handler must not only translate the command to a corresponding drawing modes for the system upon which the emulation is being performed, the handler must also perform various set up operations prior to the issuance of the corresponding command(s) for the local environment according to the emulated environment. Table 1 below shows a brief sampling of commands which do have a one-to-one correspondence. Note, however, that this list is not exhaustive.

TABLE 1

Macintosh to X Windows Command mappings

| Macintosh | X |
| --- | --- |
| srcCopy | GXcopy |
| srcOr | GXor |
| srcXor | GXxor |
| srcBic | GXand |
| notSrcCopy | GXcopyInverted |
| notSrcOr | GXorInverted |
| notSrcXor | GXequiv |
| notSrcBic | GXandInverted |
| patCopy | GXcopy |
| patOr | GXor |
| patXor | GXxor |
| patBic | GXand |
| notPatCopy | GXcopyInverted |
| notPatOr | GXorInverted |
| notPatXor | GXequiv |
| notPatBic | GXandInverted |

First, at step 602, the global imaging parameters for the first graphics subsystem (that being translated) is set at step 602. For example, the command setDepth() in the Quickdraw graphics subsystem changes the bit depth or the number of colors on the display. At step 604 configuration for the application is performed, such as by setting the window-specific imaging parameters. At step 606 setup for the graphics requests are set up. These include, in the Quickdraw toolbox, GrafPort-specific imaging parameters. For example, SetClip() can be used to set the clipping region and PenPat() can be used to set the pen color.

Subsequently thereto, an imaging request is made to the graphics subsystem at step 608. In Quickdraw, the calls Drawstring() or PaintRect() to render a string or paint a rectangle. Then, the unmodified system software is jumped to at step 610. The so-called toolbox "bottleneck" trap is invoked in the emulation environment. For example, for font rendering, the call to StdText() is made, or for rectangle-shaped object rendering, the call StdRect() is made. At step 612, the dynamic translator handles the incoming trap to convert the Quickdraw requests to X Windows imaging requests based upon the graphics request which has been received, and the configuration information relevant to the particular graphics request.

Step 614 and subsequent steps perform the translation process. At step 614, it is determined which class of Xlib routines are required based upon the type of trap which occurred. For example, for StdRect() Quickdraw commands, corresponding Xlib calls may include XCopyArea() or XFillRectangle(). At step 616, the XWindows imaging parameters are set up based upon the arguments passed during the trap, such as for a bounding rectangle in the example of rendering an object. At step 618, set up for the imaging parameters is performed based upon the GrafPort. Examples include clipping of the geometry, e.g. XSetClipRectangle(), or setting foreground information, e.g. XSetForeground(). At step 620, the X imaging request invocation is performed. A protocol request representing a sequence of translated calls is built using the X protocol to perform the desired function and sent to the X server across the network 310. At step 622, the X server (e.g. one of 320–322) receives the protocol request and performs the imaging and rendering as required by the protocol request. The dynamic translation and imaging is thus complete.

Rendering a Rectangle

A first implementation of the dynamic translation process discussed above is shown and discussed with reference to FIGS. 7a and 7b. The process commences at step 702 of FIG. 7a with the standard toolbox trap, in the Mac OS operating system, e.g. StdRect(). At step 704, the image is drawn into the emulated frame buffer and the imaging parameters for Quickdraw, such as the pen mode, color, etc., are saved. A toolbox bottleneck trap to finish the operation, such as ShowCursor, is detected at step 706. At step 708 it is determined whether enough information is present to dynamically translate the graphics call. If not, then step 710 is executed to return a failure and the process exits at steps 740 and 742 wherein a bit map (and compression, if desired), are generated instead of the corresponding toolbox commands to perform the operation.

If there was sufficient information present about the operation to dynamically translate, process 700 proceeds to step 712. The specific X parameters for the operation can be translated for the remaining steps according to the arguments sent during the toolbox trap. These are checked in the subsequent steps for translation from the toolbox commands for the first computer system (the emulated system—e.g. Quickdraw commands on the Mac OS) into the appropriate commands for the target platform (e.g. Xlib commands). At step 712, the GCLineWidth is set equal to that for the Mac OS, according to some preestablished translation. At step 714, if the Mac OS system's drawmode is inverted and the X depth is the same as the Mac OS system's depth, then the X variables are set appropriately at step 716 and the process returns success at step 740 and 742. In the case of the drawmode being erase or fill, as detected at step 718, the X GCFunction is set equal to GXCopy at step 720.

Figure 7B:
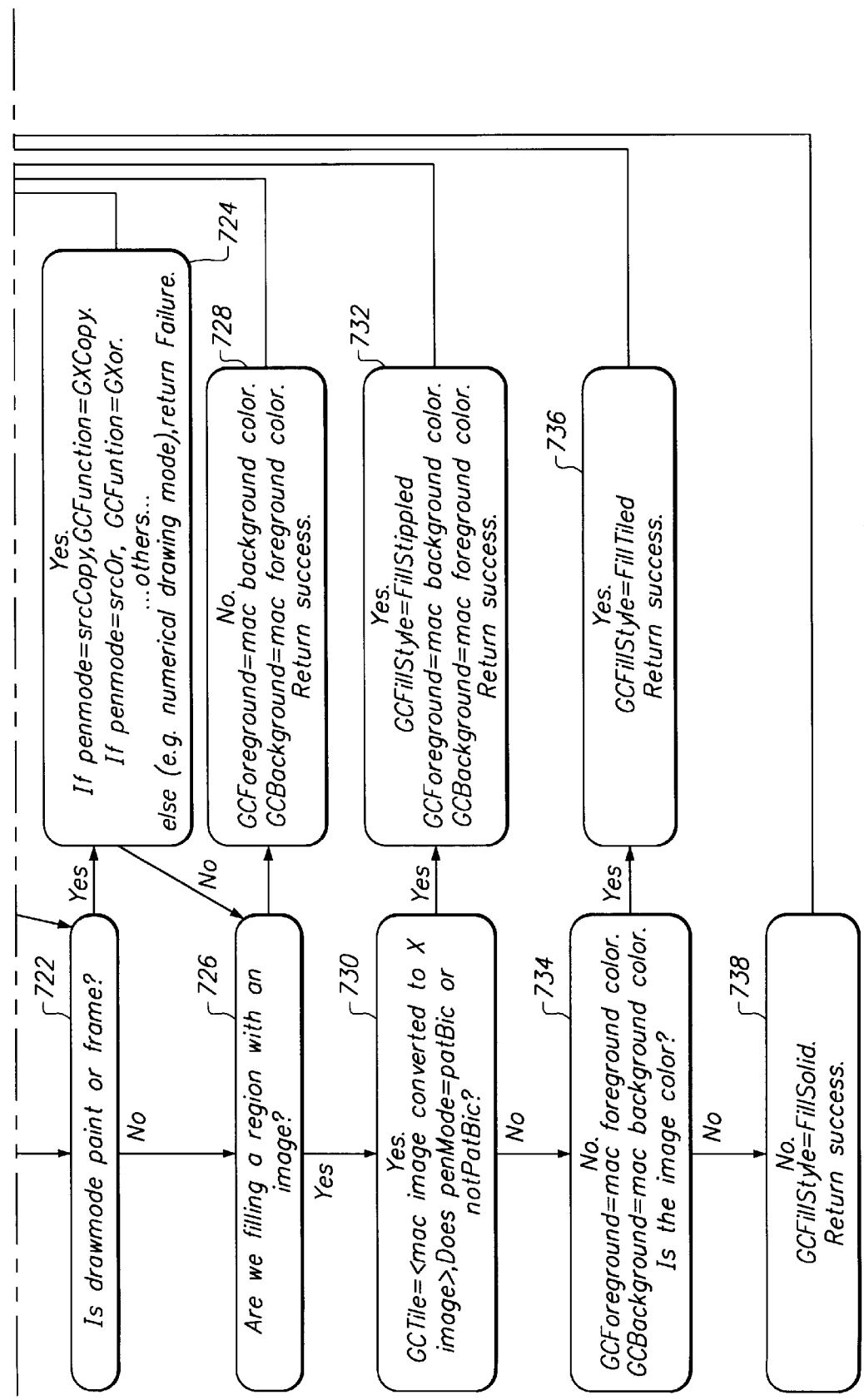

The process continues at step 722 of FIG. 7b. It is determined whether the drawmode is paint or frame. If so, then step 724 is performed which sets appropriate X variables according to the penmode, and if no valid penmode is present, returns a failure. The process continues at step 726. At step 726 it is determined whether a region is being filled with an image. If so, at step 728, the X Windows background and foreground colors are set to those on the Macintosh and the process returns successfully. At step 730 the GCTile variable is set equal to a Macintosh bitmap converted to X Windows bit map format. If it is detected at step 730 whether the penmode is patBic of notPatBic then the variable GCFillStyle is set equal to the Macintosh variable FillStippled and the X Windows background and foreground colors are set appropriately, and the process successfully returns.

If the penmode was not set as detected at step 730 above, then, at step 734, it is determined whether the background and foreground colors are already set equal to the Macintosh colors. If so, then, at step 736, the X variable GCFillStyle is set equal to the Macintosh variable FillTiled, and the process successfully returns. If not, at step 738, then GCFillStyle is set equal to the Macintosh variable FillSolid, and the process successfully returns.

Upon the completion of any of the operations for rendering a rectangle, as shown in process 700 of FIGS. 7a and 7b, check 740 is performed to determine whether the operation completed successfully. If so, then the step 742 is performed to issue the translated Xlib routines to perform the desired function(s) which correspond with the toolbox trap. That is, the appropriate Xlib routines may be issued from the X client 300 to any or all of the X servers 320–322. If not then, at step 744, the process performs the prior art low-level emulation, wherein a bit map is generated in client 300 and sent to one or all of servers 320–322. This may be performed with or without compression according to implementation to reduce the impact on network bandwidth. Process 700 is thus complete.

Rendering Text

Figure 8:
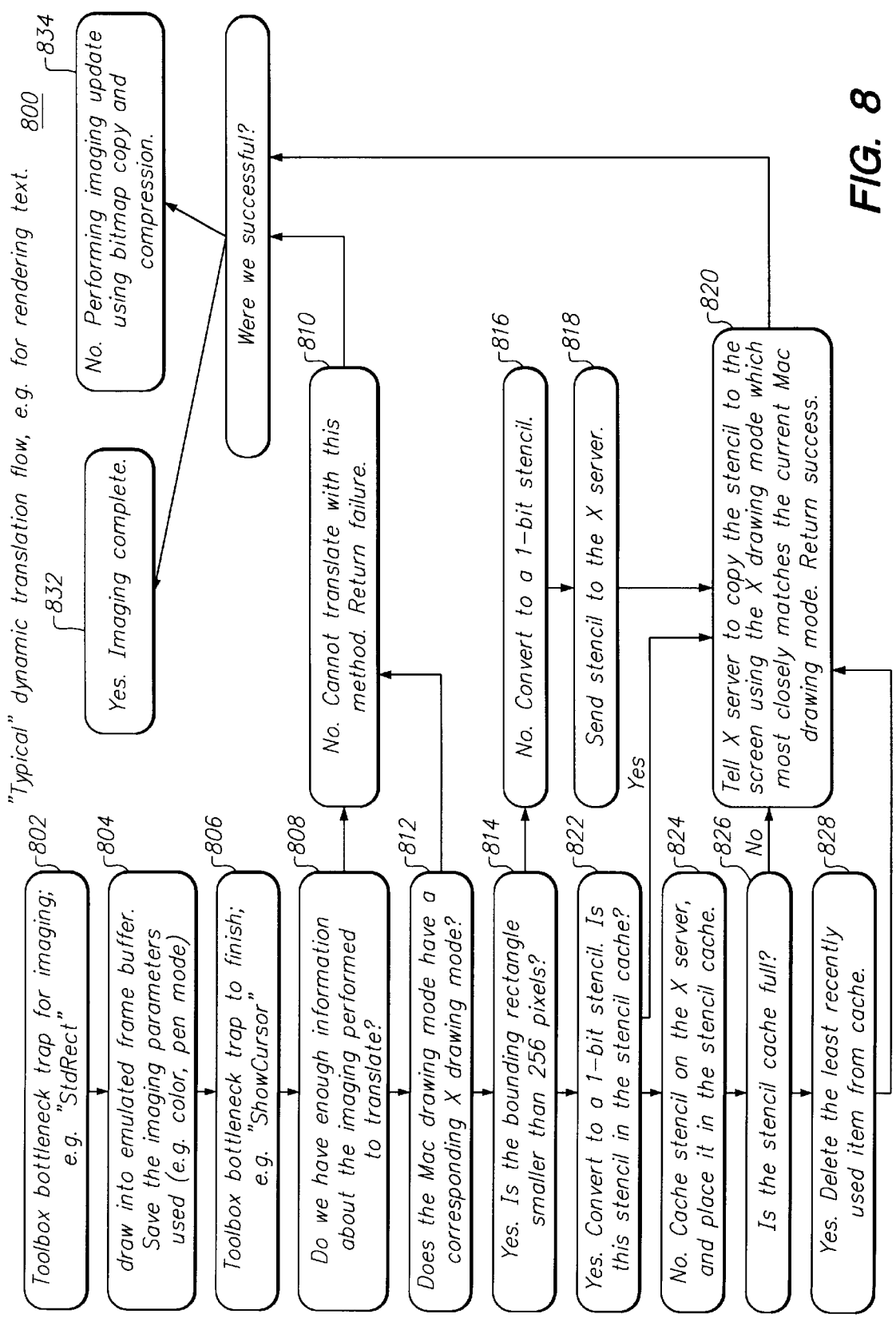

A second example of the dynamic translation process is shown in FIG. 8. Process 800 is similar to processes 600 and 700 except for the differences required for the rendering of text in the Macintosh environment to the X Windows environment. A standard toolbox trap 802 is detected, such as by the toolbox call StdText(). Then, at step 804, the imaging parameters are saved and the image is drawn into the emulated frame buffer at step 804. Subsequently thereto, another toolbox "bottleneck" trap is detected at step 806, such as by the call ShowCursor(). It is determined at step 808 whether enough information exists to translate the image from the first system (emulated) to the second system (local). If not, then the process returns at step 810 indicating that it cannot translate with this particular method.

If the method can be translated, then step 812 is executed which determines whether the Macintosh has a drawing mode corresponding with the X Windows drawing mode. If not, then step 810 is again executed and a failure is indicated. If there is a corresponding drawing mode, and the bounding rectangle is not less than 256 pixels, as detected at step 814, then step 816 is performed wherein the image is converted to a 1-bit stencil. A stencil is a one-bit mask for displaying an image. The bit specifies whether a color or an underlying image will be displayed on the X server. For text, 1 bit specifies the pixels comprising the text (either the text itself, or an outline of the text, according to implementation).

The stencil is then sent to the X server, and the X server is instructed to copy the stencil to the screen using the X mode which most closely matches the current Macintosh drawing mode at step 820. A successful translation is indicated.

If the bounding rectangle was smaller than 256 pixels, then a 1-bit stencil is also created, and it is determined whether the stencil is already in a stencil cache for the client at step 822. If so, at step 820, the X server is again instructed to copy the stencil to the screen and success is indicated. If the stencil was not cached, then it is cached at step 824. If the stencil cache is full (step 826), then the least recently used item in the cache is deleted (step 828), and in either event the server is instructed to perform the imaging at step 820.

Like the processes described above a final check in the method is performed at step 830 to determine whether the method was successful. If so, then the Xlib calls were made, and the method returns successful at step 832. If not, then the imaging update must be performed using the emulator and a bit map transmission at step 834, with any compression, according to implementation.

Highlighting

Figure 9:
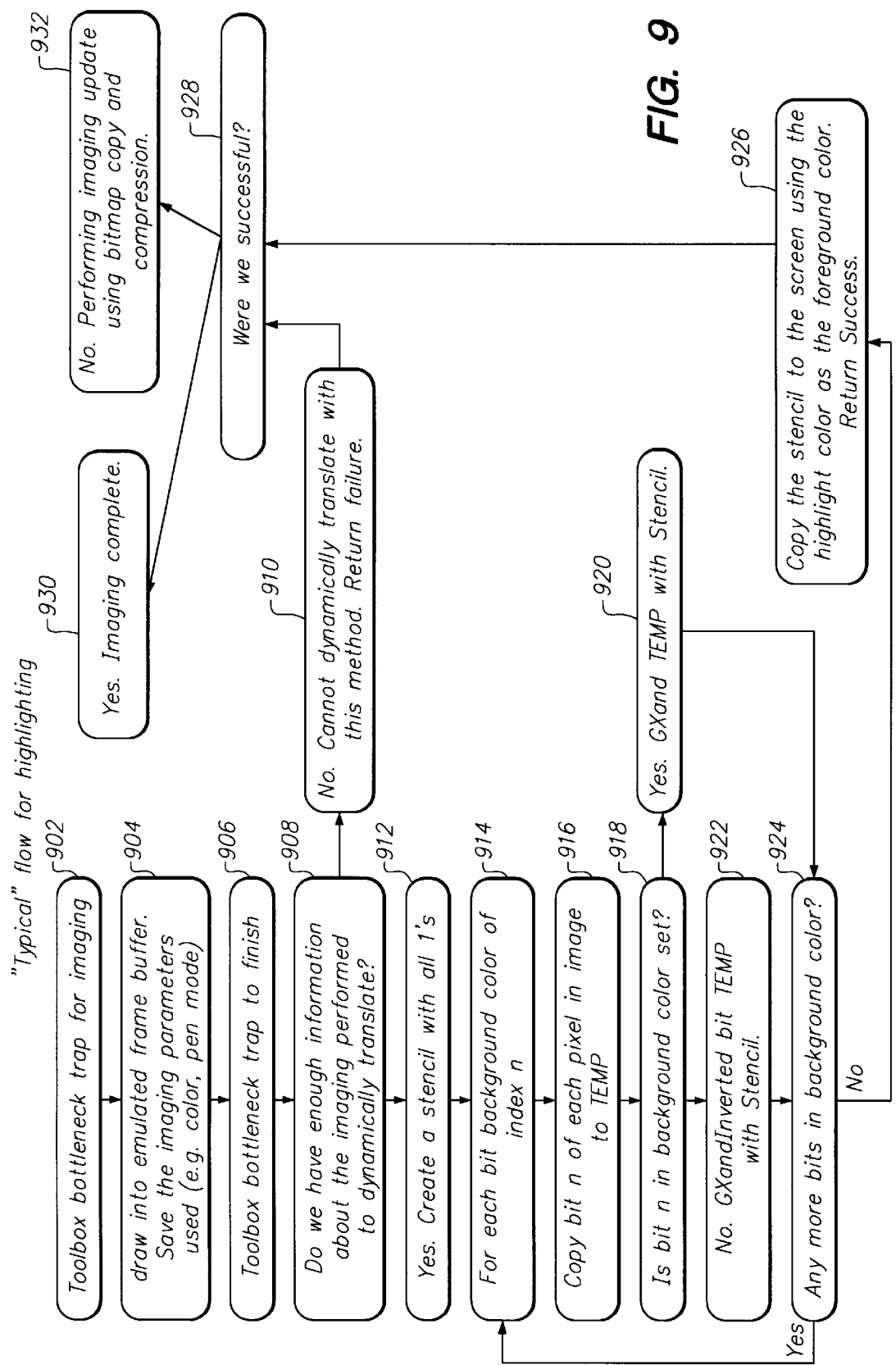

One operation which is used on the Macintosh but which has no X Windows equivalent is the "highlight" operation. Prior art solutions to this simply perform the highlighting in the emulated frame buffer and transfer the bitmap. A third example of the dynamic translation process is thus shown in FIG. 9 which illustrates this method. First, the standard toolbox trap 902 is detected. Then, at step 904, the imaging parameters are saved and the image is drawn into the emulated frame buffer at step 904. Subsequently thereto, another toolbox "bottleneck" trap is detected at step 906. It is determined at step 908 whether enough information exists to translate the image. If not, then the process returns at step 910 indicating that it cannot translate with this particular method.

To perform highlighting in X servers, for the region to be highlighted, the background color (not part of the image) is set to the highlight color. This is done with a stencil. Steps 912–924 create the stencil to be used for the highlighting. In summary, for each pixel that equals the background color, the corresponding stencil bit is set. This allows the highlight color to be imaged on the X server during the final rendering step. However, it cannot be determined with accuracy which pixels are set to the background color in the X server, so a series of steps must be performed in order to create the stencil and highlight the region.

Step 912 is performed which initializes a new stencil for the highlighted region with all 1's for the correponding pixels. If imaging were performed at this point, the entire region would be highlighted, including those portions which were not the background color. This would obscure the image. The stencil must be be further processed at steps 914–924. Each of the bits of the background color are compared against the corresponding bits of each pixel in the highlighted region.

At step 916 bit n (the bit of the background color being processed) of each of the pixels in the region are copied to some temporary location, e.g. TEMP. At step 918, it is determined whether bit n in the background color is set. If so, then an AND function (e.g. GXand in X Windows) is performed against bit n for each corresponding pixel and the corresponding stencil bit at step 920. Thus, if the bit n of the highlighted region is set and the stencil bit is set, then the stencil bit is set. If not, then the stencil bit is cleared (the background/existing image is allowed to pass through unmodified when rendering occurs). This is performed for each bit n of all of the pixels in the region.

If bit n of the background color is not set, then step 922 is performed wherein an inverted AND (e.g. GXandInverted) is performed between the TEMP and the stencil. That is, bit n of the stencil is set equal to inverted bit n of TEMP AND bit n of the stencil. Thus, if bit n of the highlighted region is not set and the stencil bit is set, then the stencil bit is set. If not, then the stencil bit is cleared. This is also performed for each bit n of all of the pixels in the region.

These steps 914–924 continue until the stencil completely formed, until all of the bits in the background color have been processed, as detected at step 924. Once the stencil is completely formed, at step 926, the highlight color is caused to be imaged as the foreground color to the server(s) using the stencil. Thus, the highlight color is imaged in all pixels where the background color was. The region has thus been highlighted.

Like the processes described above a final check in the method is performed at step 928 to determine whether the method was successful. If so, then imaging is complete and the method returns successful at step 930. If not, then the imaging update must be performed using the emulator and a bit map transmission is made at step 932, with any compression, according to implementation.

Compression

In addition to the translation of graphics toolbox calls from one graphics subsystem (e.g. the Quickdraw system used in the Mac OS brand operating system), implemented embodiments of the present invention use compression of graphic data from the client to the server(s). In these embodiments, a combination of color compression and run-length encoding (RLE) is used to minimize the actual data which is transmitted from the client to the server. Because the environment is emulation of a first computer system on a second computer system, compression algorithms which are normally applicable to natural images can be excluded from consideration. In addition, such compression should not result in any data loss, and should be as efficient as possible in execution in order to not have any impact on overall performance. Note further that compression can be used in combination with the dynamic translation, but only in those areas where bitmaps would otherwise be transmitted.

The generalized method for compression is illustrated with reference to FIG. 10. First, the underlying application calls an imaging routine at step 1002. Then, at step 1004, a bottleneck trap for imaging is encountered (e.g. StdRect()). The image is then drawn into the frame buffer at step 1006. The toolbox trap to finish the rendering is then encountered at step 1007. At step 1008 the area comprising the changed region of the image is compressed. The changed region (which can be determined using any number of prior techniques) is then sent between the client and the server as a compressed bit map. The bit map is then received by the proxy (or daemon), which decompresses it at step 1012, and is received by the X server at step 1014. The X server completes the operation by copying the bit map to the display at step 1016.

Figure 10:
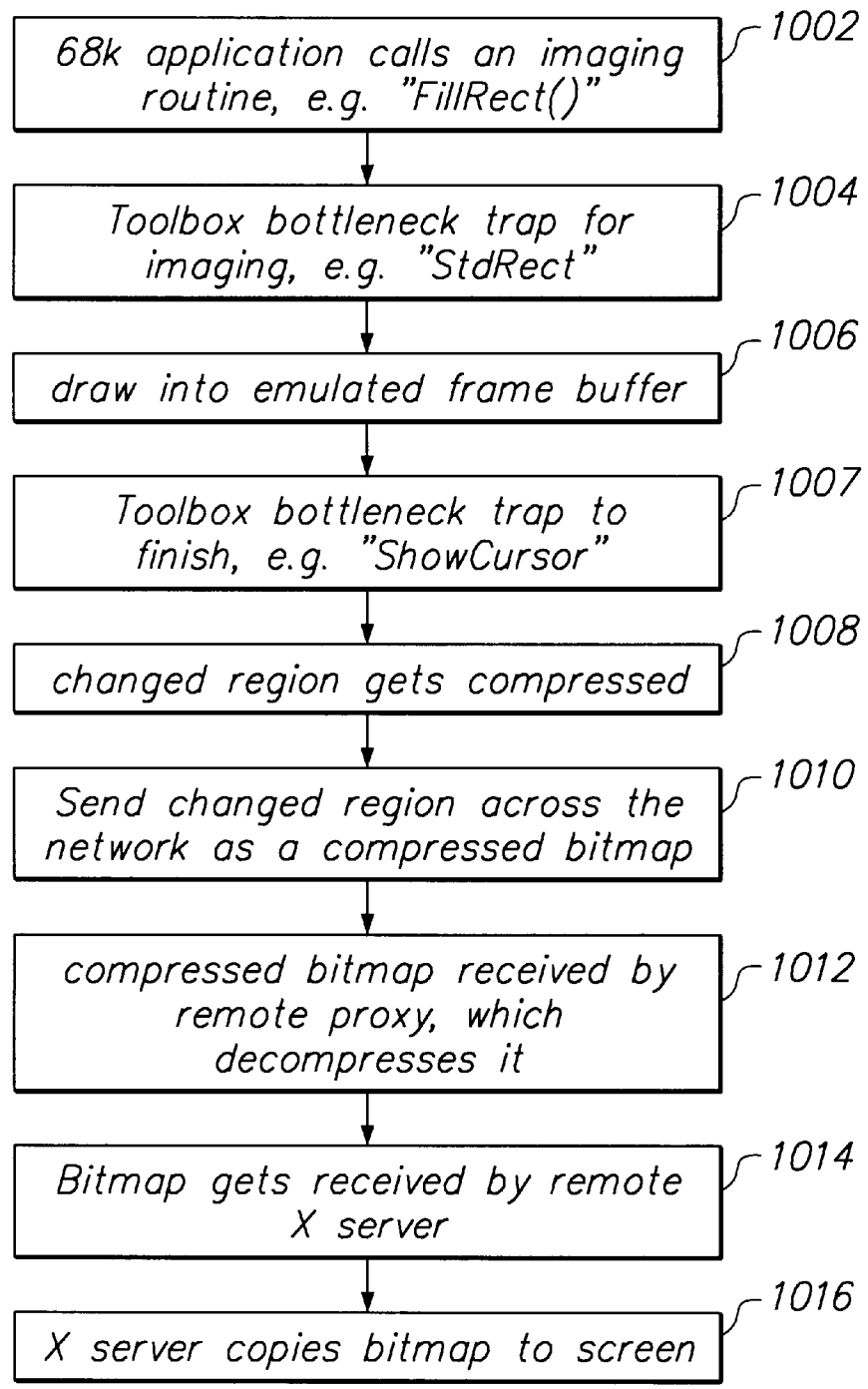
FIGS. 10–12 show methods for performing compression and run-length encoding (RLE) in the emulation system.
Figure 11:
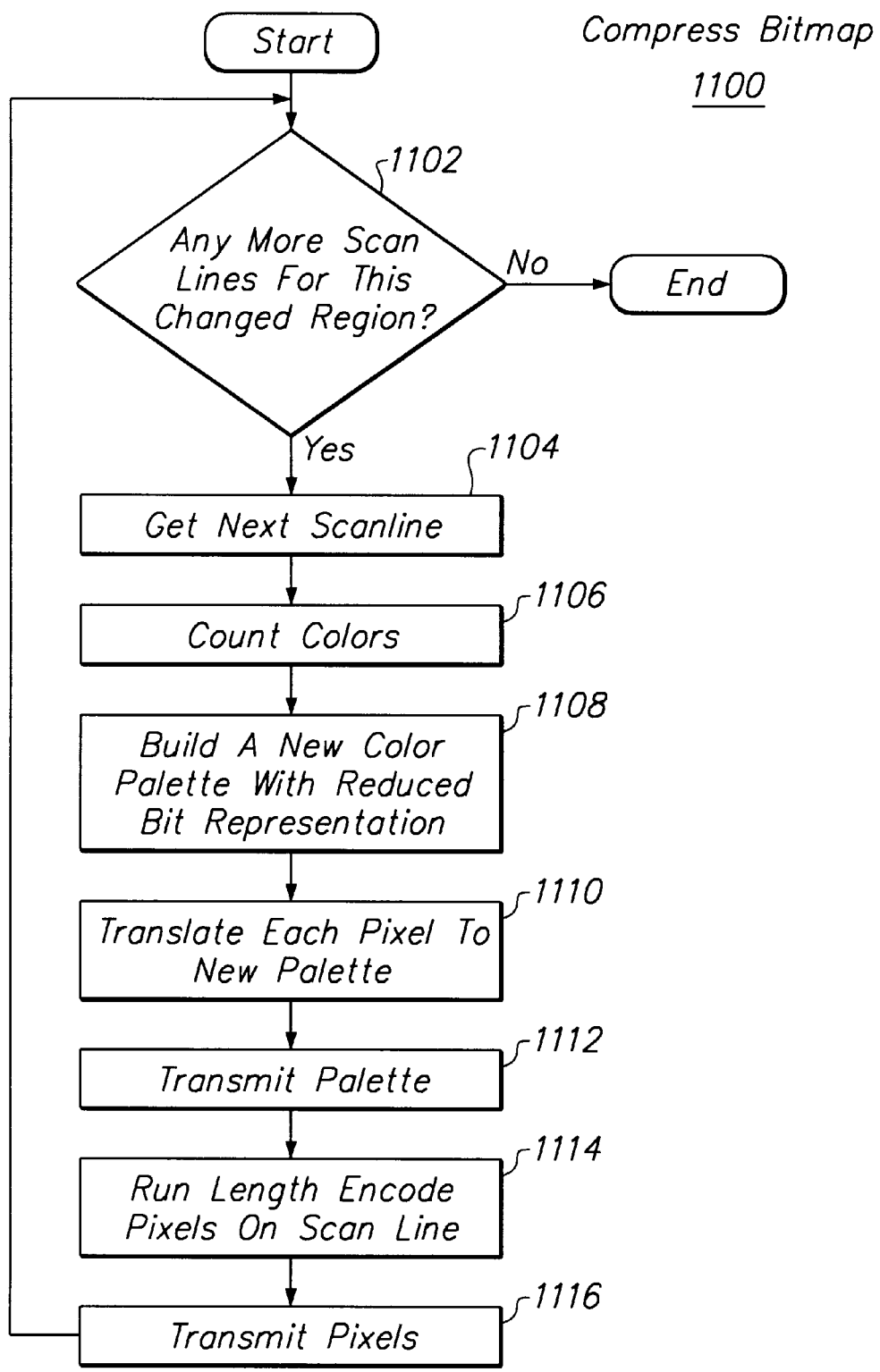

Process 1100 illustrates the compression process, such as 1008, shown in FIG. 10. This can be applied to any bit map, but because it is non-lossy and relatively unsophisticated, it has performance and quality advantages over methods which are typically used for compression of natural imagery. The method operates on a scan-line basis, compressing each scan line at a time. The method starts at step 1102 and determines whether there are any additional scan lines to be processed. If so, then the next scan line is retrieved at step 1104. The number of colors in the scan line is counted at step 1106. This is to reduce the number of bits used to represent the colors on the line. At step 1108, the new palette is created with a reduced bit representation. For example, if the color palette was 256, and the color counting yielded only 16 colors on the line, then 4 bits only are required to represent colors on the line. Each pixel on the line is then converted to the reduced palette representation at step 1110. The palette is then transmitted from the X client to the X server at step 1112. The palette itself can be transmitted in a form which references the previous color palette, the number of new colors in the new palette, and the index for each color in the previous palette. This further reduces the amount of data which is required to be transmitted, avoiding the transmission of the colors themselves.

Subsequently thereto, the pixels on the scan line can be run-length encoded at step 1114. The details of this are discussed below. Step 1116 then transmits the pixels in the run-length encoded representation, and the scan line processing is thus complete. Steps 1102–1116 iterate until no additional scan lines remain to be processed, and the method is thus complete.

Figure 12:
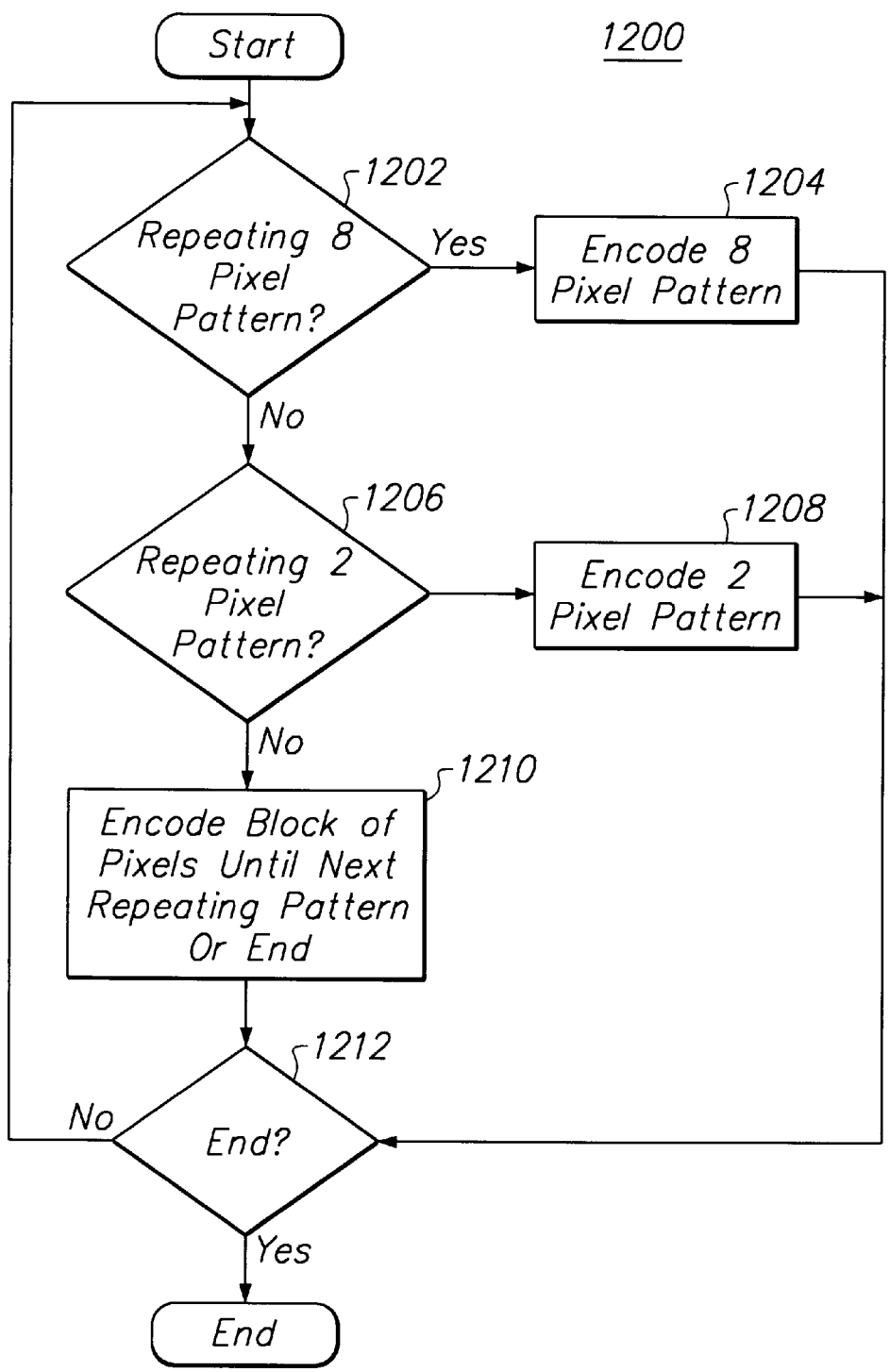

Process 1200 of FIG. 12 shows a method for run-length encoding. The method run-length encodes patterns of 2 and 8 pixels, respectively, and transmits each group of patterns to the X servers in blocks with a tag preceding the data indicating the type of block, a run value, and the data. The type indicates whether the data is in a group of 8, 2, or is simply a data pattern (does not repeat). The run value indicates the number of times the pattern is repeated for the run. The data is the data for the run. The run length encode method starts at step 1202 and determines whether there are any 8 pixel repeating patterns at the start of the line. If so, then the 8 pixel repeating pattern(s) are encoded at step 1204. If not, at step 1206, it is determined whether there are any 2 pixel repeating patterns. If so, then the 2 pixel repeating pattern(s) are encoded for their run at step 1208. If not, then the scan line is encoded with a non-repeating pattern at step 1210 until a next repeating pattern is detected or the end of the scan line is reached. If it is the end of the scan line, as detected at step 1212, then the process is complete. Otherwise, the process repeats again at step 1202.

Thus, by use of the foregoing, improved emulation of a first computer system on a second computer system (or systems), can be achieved by use of the foregoing methods. It will be appreciated that though the foregoing has been described especially with reference to FIGS. 1–12, that many modifications made be made, by one skilled in the art, without departing from the scope of the invention as described here. The invention is thus to be viewed as limited only by the appended claims which follow.

What is claimed is:

1. An automatic method for compressing graphic data for a first computer system on a second computer system comprising the following steps:
   a. for each scanline of said graphic data for said first computer system, counting a number of colors present on said scanline;
   b. forming a new color palette for said scanline at a reduced representation;
   c. converting a representation of each color of each pixel on said scanline to said new palette; and
   d. run-length encoding said scanline.

2. The method of claim 1 wherein said step of run-length encoding said scanline includes run-length encoding said colors in groups of two or eight consecutive pixels on said scanline.

3. The method of claim 1 further comprising the step of transmitting a compressed representation of said scanline between a client and a server.

4. The method of claim 3 wherein said step of transmitting said compressed representation of said scanline includes transmitting said new palette and said each color of said scanline after said converting and said run-length encoding.

5. The method of claim 1 wherein said graphic data includes computer-generated graphic information generated via graphics subsystem calls for said first computer system.

6. The method of claim 5 wherein said graphic data includes a bitmap which is formed by an emulator interpreting said graphics subsystem calls for said first computer system and generating said bitmap responsive thereto.

7. The method of claim 3 wherein said client comprises an X-client and said server comprises an X-server.

8. The method of claim 1 wherein said first computer system includes a Macinstosh and said second computer system includes a Unix workstation.

9. An apparatus for compressing graphic data for a first computer system on a second computer system comprising the following steps:
   a. a counter for counting a number of colors present on each scanline of said graphic data for said first computer system;
   b. a new color palette generator coupled to said counter for forming a new color palette for said scanline at a reduced representation;
   c. a converter coupled to said new color palette generator for converting a representation of each color of each pixel on said scanline to said new palette; and
   d. a run-length encoder coupled to said converter for run-length encoding said scanline.

10. The apparatus of claim 9 wherein said run-length encoder includes a means for run-length encoding said colors in groups of two or eight consecutive pixels on said scanline.

11. The apparatus of claim 9 further comprising a transmitter for transmitting a compressed representation of said scanline between a client and a server.

12. The apparatus of claim 11 wherein said transmitter includes a means for transmitting said said new palette and said each color of said scanline after said converting and said run-length encoding.

13. The apparatus of claim 9 wherein said graphic data includes computer-generated graphic information generated via graphics subsystem calls for said first computer system.

14. The apparatus of claim 13 wherein said graphic data includes a bitmap which is formed by an emulator interpreting said graphics subsystem calls for said first computer system and generating said bitmap responsive thereto.

15. The apparatus of claim 11 wherein said client comprises an X-client and said server comprises an X-server.

16. The apparatus of claim 9 wherein said first computer system includes a Macintosh and said second computer system includes a Unix workstation.

17. A computer readable medium containing a series of instructions which, when loaded into a computer system, causes it to perform a method comprising the following steps:
   a. for each scanline of said graphic data for said first computer system, counting a number of colors present on said scanline;
   b. forming a new color palette for said scanline at a reduced representation;
   c. converting a representation of each color of each pixel on said scanline to said new palette; and
   d. run-length encoding said scanline.

18. The computer readable medium of claim 17 wherein said step of run-length encoding said scanline includes run-length encoding said colors in groups of two or eight consecutive pixels on said scanline.

19. The computer readable medium of claim 17 further comprising instructions for transmitting a compressed representation of said scanline between a client and a server.

20. The computer readable medium of claim 19 wherein said step of transmitting said compressed representation of said scanline includes transmitting said new palette and said each color of said scanline after said converting and said run-length encoding.

21. The computer readable medium of claim 17 wherein said graphic data includes computer-generated graphic information generated via graphics subsystem calls for said first computer system.

22. The computer readable medium of claim 21 wherein said graphic data includes a bitmap which is formed by an emulator interpreting said graphics subsystem calls for said first computer system and generating said bitmap responsive thereto.

23. The computer readable medium of claim 19 wherein said client comprises an X-client and said server comprises an X-server.

24. The computer readable medium of claim 17 wherein said first computer system includes a Macinstosh and said second computer system includes a Unix workstation.

25. A computer readable medium containing a series of instructions which, when loaded into a computer system, causes it to perform any of the methods of claims 1–8.

* * * * *